United States Patent Office 3,066,545
Patented Dec. 4, 1962

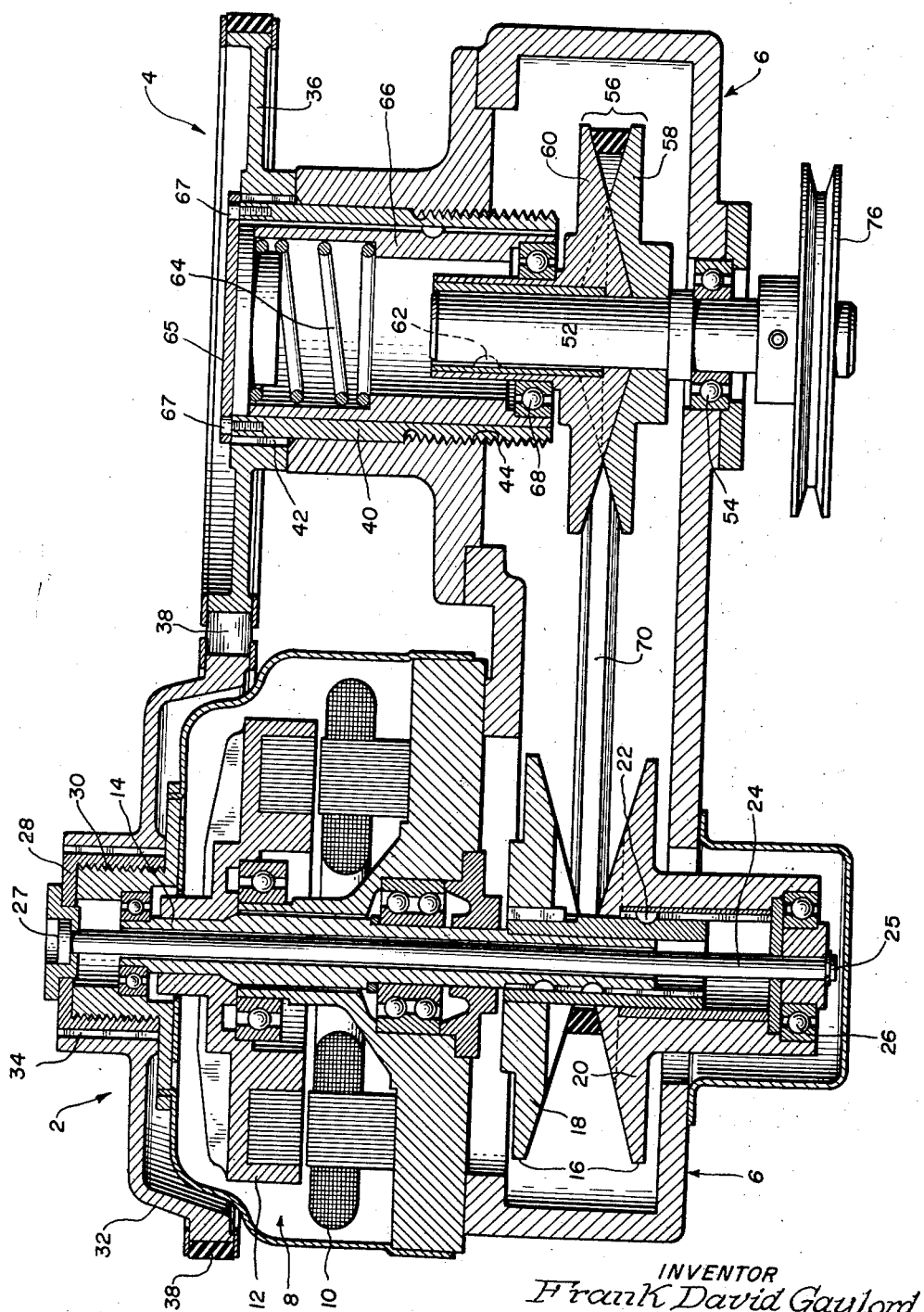

3,066,545
VARIABLE SPEED DRIVE
Frank D. Gaylord, Freeport, Ill., assignor to Fairbanks, Morse & Co., Chicago, Ill., a corporation of Illinois
Filed Dec. 22, 1960, Ser. No. 77,672
2 Claims. (Cl. 74—230.17)

This invention relates to variable speed belt drives and is particularly directed to novel variable speed belt drives having means for varying belt tension as the belt speed is varied.

It is well known that, in designing belt drives, fixed diameter pulleys are preferable to variable diameter pulleys. However, where it is necessary or desirable to provide infinitely variable belt speeds, an infinite number of fixed diameter pulleys would be required. As this is clearly impractical, variable diameter pulleys have been employed as a compromise dictated by necessity. Thus, in designing a variable speed drive, the ultimate aim is to reproduce as closely as possible, the characteristics which would be obtained by an infinite number of fixed diameter pulleys.

It is also well known that, in designing variable speed belt drives, there are five parameters which must be considered. These are belt length, distance between pulley shaft centers, pitch diameter range of the driving and driven pulleys, horsepower transmitted, and rate of rotation of the driving pulley. In any belt drive, the pulley diameters are so related that, for any given diameter on one pulley, there is one, and only one, pitch diameter for the other pulley which will maintain proper belt tension. This is extremely important as improper belt tension may cause slippage which reduces the delivered horsepower and efficiency of the drive, reduces belt life or may cause excessive bearing loads which also reduce the horsepower and efficiency of the drive and cause heating which reduces bearing life.

Unfortunately, the change in diameter of one pulley required for maintaining proper belt tension does not bear a linear relationship to the change in diameter of the other pulley. The relationship can be expressed in a mathematical formula, as is well known to those skilled in the art. However, the relationship is not a simple one. Numerous methods and apparatus have been proposed heretofore for approximating this relationship in mechanical form in variable speed drive systems. However, none of these systems have been entirely satisfactory.

Some prior art systems have attempted to provide non-resilient adjustment means to adjust the pulley diameters in accordance with the relationship discussed above. However, this requires highly expensive machining of parts and is impractical for most purposes. Others have caused both pulleys to be adjusted by like amounts and have provided idler pulleys to maintain proper belt tension. On the other hand, space requirements frequently preclude the use of idler pulleys. Still other prior art systems have provided means for adjusting the pitch diameter of the driving pulley and have spring loaded the movable face of the driven pulley. However, many of these systems do not employ a follower with the spring. In these cases, the belt tension will decrease or remain constant as the pulley pitch diameter increases. In contrast, it has been found that, for optimum results, the belt tension should increase as the driven pulley diameter increases. Other systems have provided followers, but have caused the follower position to be adjusted an amount equal to the adjustment of the driving pulley. This results in constant belt tension at all pulley diameters. However, as noted above, the belt tension should increase with increasing driven pulley pitch diameter for best results. No system has been proposed heretofore for accomplishing this. Furthermore, with virtually all of the prior art variable speed drives, the ratio of movement of the movable members of the pulleys could be altered only by substantial disassembly of the drive mechanism, if it could be altered at all.

These disadvantages of prior art variable speed drives are overcome with the present invention and a novel belt drive is provided wherein the belt tension increases as the driven pulley diameter increases. Thus, the belt drive of the present invention approximates the ideal relationship more closely than any of the prior art systems. Consequently, the efficiency of the belt drive is increased and the belt life is extended while slippage and heating are greatly reduced.

The advantages of the present invention are preferably attained by providing a novel variable speed belt drive comprising a driving member and a driven member; said driving member comprising a first stationary member, first pulley means including two pulley forming members mounted for rotation about a common axis, first control means threadedly connected to said first stationary member for axially moving one of the pulley forming members of said first pulley means, first interlock means having splined connection with said first control means for axially adjusting said first control means, and means for driving said first pulley means; said driven member comprising a second stationary member, second pulley means including two pulley forming members mounted for rotation about a common axis, resilient means urging one of the pulley forming members of said second pulley means, follower means for varying the pressure applied to said resilient means, second control means threadedly connected to said second stationary member for axially moving said follower means, and second interlock means having splined connection with said second control means for axially adjusting said second control means; means coupling said first and second interlock means in such a way that rotation of one of said interlock means will cause rotation of the other of said interlock means; and belt means coupling said first and second pulley means to drive said second pulley means.

Accordingly, it is an object of the present invention to provide a novel variable speed belt drive.

Another object of the present invention is to provide a novel variable speed belt drive wherein the belt tension increases as the driven pulley pitch diameter increases.

A further object of the present invention is to provide a novel variable speed belt drive in which the ratio of movement of the movable members of the pulley means may be quickly and easily altered.

A specific object of the present invention is to provide a novel variable speed belt drive comprising a driving member and a driven member; said driving member comprising a first stationary member, first pulley means including two pulley forming members mounted for rotation about a common axis, first shaft means threadedly connected to said first stationary member for axially moving one of the pulley forming members of said first pulley means, first interlock means having splined connection with said first control means for axially adjusting said first control means, and means for driving said first pulley means; said driven member comprising a second stationary member, second pulley means including two pulley forming members mounted for rotation about a common axis, resilient means urging one of the pulley forming members of said second pulley means toward the other pulley forming member of said second pulley means, follower means for varying the pressure applied to said resilient means, second control means threadedly connected to said second stationary member for axially moving said follower means, and second interlock means having splined connection with said second control means for axially adjusting said second control means; means coupling said first and second interlock means in such a way that rotation of one of said interlock means will cause rotation of the other of said interlock means; and belt means coupling said first and second pulley means to drive said second pulley means.

These and other objects and features of the present invention will be apparent from the following detailed description taken in connection with the figure of the accompanying drawing.

In the drawing:

The single FIGURE is a view, partly in section, of a typical variable speed belt drive embodying the present invention.

In that form of the present invention chosen for purposes of illustration in the drawing, there is shown a typical variable speed belt drive having a driving member 2 and a driven member 4 mounted in a suitable housing 6. As shown, the housing 6 is common to both the driving and driven members. The driving member 2 includes a motor 8 having a stator 10 and a rotor 12 which serves to rotate a tubular driveshaft 14. A pulley assembly 16 is mounted on the driveshaft 14 for rotation thereby and includes a pair of conical pulley forming members 18 and 20. Pulley forming member 18 is fixedly secured to the driveshaft 14 while pulley forming member 20 has a keyed or splined connection with driveshaft 14, as indicated at 22. A rod 24 extends through the tubular driveshaft 14 and pulley forming member 20 is secured to one end 25 of rod 24 by a suitable bearing 26. Thus, pulley member 20 is rotatable by driveshaft 14 through the keyed connection 22 and is movable axially by rod 24 through bearing 26. At its opposite end 27, rod 24 is secured to a coupling member 28 which is threadedly connected to the housing 6, as indicated at 30, and which has a splined connection with a rotatable interlock member 32, as shown at 34.

With this arrangement, rotation of the interlock member 32 will cause axial movement of the coupling member 28, due to the threaded connection 30 between coupling member 28 and the housing 6. The movement of coupling member 28 will be transmitted by rod 24 and bearing 26 to the pulley forming member 20. Thus, the pitch diameter of pulley assembly 16 may be readily adjusted by rotation of interlock member 32. However, due to the splined connection 34 between the interlock member 32 and coupling member 28, the movement of coupling member 28 will not cause axial displacement of the interlock member 32. Axial displacement of member 32 outwardly from its assembly position shown, is precluded by suitable retainer means such as one or more removable clips one of which is shown at 32a. Thus, if desired, the interlock member 32 may conveniently be rotated, either manually or by remote control through suitable belts, gearing or the like, to control the pitch diameter of the driving pulley assembly 16.

The driven member 4 has an interlock member 36 which may, if desired, be rotated independently of the driving member interlock member 32, but which is, preferably coupled to interlock member 32 by a belt 38 or the like so that rotation of one interlock member, for example, member 32, will cause simultaneous rotation of the other interlock member, member 36. The driven member 36 has a splined connection with a coupling member 40, as seen at 42, and coupling member 40 has a threaded connection with the housing 6, as illustrated at 44. Thus, rotation of interlock member 36 causes axial movement of coupling member 40 without causing axial displacement of interlock member 36. Axial displacement of the member 36 outwardly from its assembly position shown, may be prevented in any suitable manner, as by removable clip elements 36a engaged in an annular groove provided in the hub of the member.

An output shaft 52 is rotatably supported in the housing 6, as by bearing 54 and serves as the power takeoff for the system. A driven pulley assembly 56 is mounted on the shaft 52 and comprises pulley forming members 58 and 60. Pulley forming member 58 is secured against axial movement while pulley forming member 60 has a keyed connection with shaft 52 as seen at 62. Pulley forming member 60 is urged toward pulley forming member 58 by a spring 64 and a follower 66 which is rotatably mounted on pulley forming member 60 by means of bearing 68. Spring 64 bears against a pressure applying cap 65 which is secured, as by screws 67, to coupling member 40. Hence, the pressure applied to spring 64 is determined by the position of coupling member 40 and cap 65.

As noted above, rotation of interlock member 36 causes axial displacement of coupling member 40. This results in varying the pressure applied to spring 64 which permits axial movement of follower 66 and pulley forming member 60. Since pulley forming member 60 is axially movable, the compression of spring 64 remains very close to the original compression regardless of the position of coupling member 40. However, it has been found that, with this arrangement, the compression will vary to compensate for belt wear and to provide optimum belt tension. This also reduces spring flexure to a minimum and, hence, increases the life of the spring.

As described previously, the driving pulley assembly 16 is rotated by motor 8 through tubular driveshaft 14 and splined connection 22. This rotation is transmitted by a suitable belt 70 to the driven pulley assembly 56 which, in turn, rotates shaft 52. Shaft 52 may be provided with an output pulley 76 or the like. In the alternative, any suitable power takeoff may be employed, as is well known in the art.

With the apparatus thus described, the movable pulley forming member 60 of pulley assembly 56 will adjust its position automatically to compensate for changes in the pitch diameter of pulley assembly 16. At the same time, the position of coupling member 40 will be functionally related to the position of movable pulley forming member 20 of pulley assembly 16. If the pitches of the threaded connections 30 and 44 are the same and if the diameters interlock members 32 and 36 are the same, the movement of coupling member 40, and, hence, the tension applied to belt 70 by pulley forming member 20 will be constant. However, the ratio of belt tension to the pitch diameter of pulley assembly 16 may be altered by changing either the ratio of the thread pitches of coupling members 28 and 40 or the ratio of the diameters of interlock members 32 and 36 or both. Moreover, it will be seen that the coupling members 28 and 40 and interlock members 32 and 36 are readily accessible for substitution or replacement. Thus, the ratio of belt tension to movement of the pulley forming member 20 may be altered quickly and easily.

In addition, numerous other variations and modification of the proposed variable speed drive may, obviously be made without departing from the invention. Accordingly, it should be clearly understood that the form of the present invention described above and shown in the figure of the accompanying drawing is illustrative only and is not intended to limit the scope of the present invention.

I claim:

1. A variable speed drive assembly comprising
a stationary housing;
motor means in the housing and including a tubular drive shaft;
a first pair of pulley forming members mounted on said drive shaft for rotation thereby;
one of said pulley forming members being movable axially of the drive shaft relative to the other pulley forming member;

a rod extending axially through said tubular drive shaft;
a bearing connecting one end of said rod and said one pulley forming member;
a coupling member connected to the opposite end of said rod and in threaded support on a portion of said stationary housing for threading displacement relative thereto;
a first interlock member in splined connection to said coupling member and rotatable for effecting threading displacement of the latter;
an output shaft rotatably carried by the housing;
a second pair of pulley forming members mounted on said output shaft for rotation thereby;
one member of said second pair of pulley forming members being movable axially of the output shaft relative to the other member thereof;
a spring follower connected to said one member of the second pair of pulley forming members;
a second coupling member in threaded support on a portion of said housing for threading displacement relative thereto;
a spring between said second coupling member and said spring follower, effective through the latter for urging said one member of the second pair of pulley forming members toward the other member thereof;
a second interlock member in splined connection with said second coupling member and rotatable for effecting threading displacement of the latter;
means operatively connecting said first and second interlock members for conjoint rotation thereof, and
belt means drivingly connecting said first pair of pulley forming members to said second pair of pulley forming members.

2. A variable speed drive assembly comprising
a stationary housing;
motor means in the housing and including a tubular drive shaft;
a first pair of pulley forming members having opposed conical faces, mounted on said drive shaft for rotation thereby;
one of said pulley forming members being movable axially of the drive shaft relative to the other pulley forming member, to form thereby variable effective pulley diameters;
a rod extending axially through said tubular drive shaft;
a bearing connecting one end of said rod and said one pulley forming member;
a coupling member connected to the opposite end of said rod and in threaded support on a portion of said stationary housing for threading displacement relative thereto;
a first interlock member in splined connection to said coupling member and rotatable for effecting threading displacement of the latter;
an output shaft rotatably carried by the housing;
a second pair of pulley forming members having opposed conical faces, mounted on said output shaft for rotation thereby;
one member of said second pair of pulley forming members being movable axially of the output shaft relative to the other member thereof, to form thereby variable effective pulley diameters;
a spring follower;
a bearing between said spring follower and said one member of the second pair of pulley forming members;
a second coupling member in threaded support on a portion of said housing for threading displacement relative thereto;
a spring between said second coupling member and said spring follower, effective through the latter and the last said bearing for urging said one member of the second pair of pulley forming members toward the other member thereof;
a second interlock member in splined connection with said second coupling member and rotatable for effecting threading displacement of the latter;
means operatively connecting said first and second interlock members for conjoint rotation thereof, and
belt means drivingly connecting said first pair of pulley forming members to said second pair of pulley forming members.

References Cited in the file of this patent
UNITED STATES PATENTS

| | | |
|---|---|---|
| 683,241 | Anck | Sept. 24, 1901 |
| 1,066,817 | Holt et al. | July 8, 1913 |
| 2,184,395 | Morse | Dec. 26, 1939 |
| 2,211,986 | Pfleger | Aug. 20, 1940 |
| 2,297,936 | Ballman | Oct. 6, 1942 |
| 2,735,308 | Peterson | Feb. 21, 1956 |
| 2,896,460 | Mitchell | July 28, 1959 |